No. 768,991. PATENTED AUG. 30, 1904.
H. HOFFMANN.
CAR BRAKE.
APPLICATION FILED MAY 14, 1904.
NO MODEL.
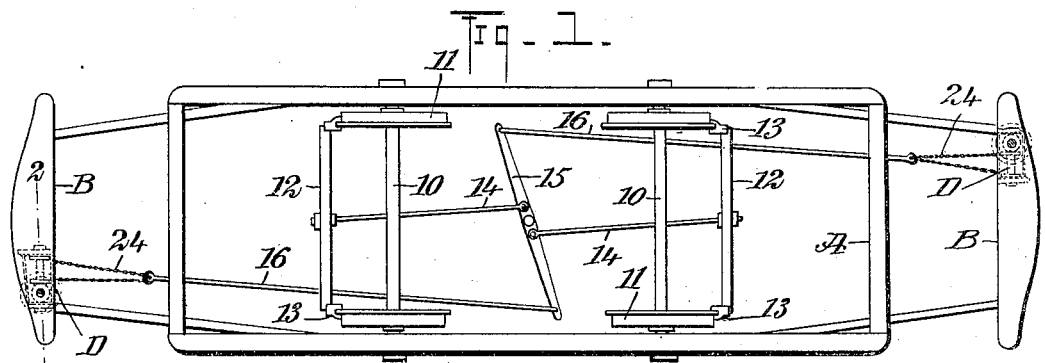
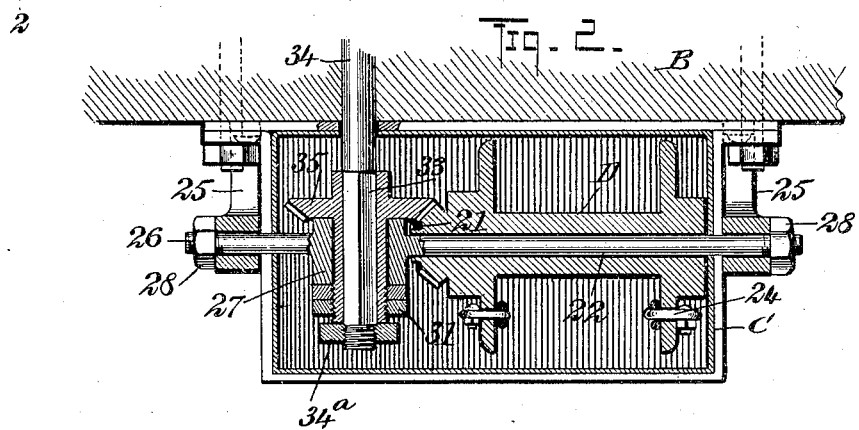
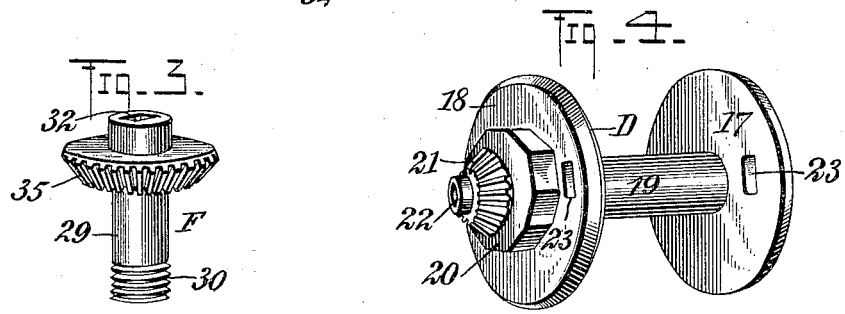
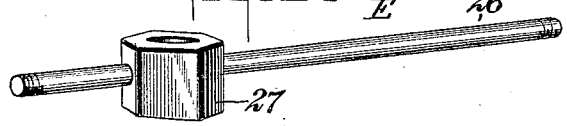
WITNESSES:
INVENTOR
Henry Hoffmann
BY
ATTORNEYS No. 768,991. Patented August 30, 1904.

UNITED STATES PATENT OFFICE.

HENRY HOFFMANN, OF NEW ROCHELLE, NEW YORK.

CAR-BRAKE.

SPECIFICATION forming part of Letters Patent No. 768,991, dated August 30, 1904.

Application filed May 14, 1904. Serial No. 207,946. (No model.)

*To all whom it may concern:*

Be it known that I, HENRY HOFFMANN, a citizen of the United States, and a resident of New Rochelle, in the county of Westchester and State of New York, have invented a new and Improved Car-Brake, of which the following is a full, clear, and exact description.

The purpose of the invention is to provide a construction of car-brake which will be simple, quick in action, and under the perfect control of a motorman or other attendant even should the strength of the attendant be below normal.

Another purpose of the invention is to dispense with the winding of the brake-chains directly on the brake-shafts and to provide a brake construction which will not only be economic, but which may be readily adapted to any type of rolling-stock.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of a car illustrating the adaptation of my improved brake. Fig. 2 is an enlarged vertical section through the brake mechanism and a portion of the car structure, the section being taken practically on the line 2 2 of Fig. 1; and Figs. 3, 4, and 5 are perspective views of details of the said brake construction.

A represents the framework of a car viewed from the top, and B the outer end sills for the platform of the car, the improved brake mechanism being shown by dotted lines as located beneath the said sills. The frame of the car is shown as provided with two axles 10, each carrying two wheels 11, and the ordinary brake-beams 12 are illustrated, each having shoes 13 for engagement with the wheels 11. Links 14 extend from the brake-beams to a bar-lever 15, pivoted about centrally to any convenient support beneath the lower frame of the car shown in Fig. 1, and the links 14 are pivoted to this bar-lever, one at each side of its pivot. Further in the construction, at the bottom portion of the car shown in Fig. 1, which construction is ordinary or may be varied, outer links 16 are pivotally attached to the outer ends of the bar-lever 15, and these links 16 are carried out in direction of the platform-sills B and are preferably made to terminate at their outer ends in eyes, for a purpose to be hereinafter described.

With reference to the improved brake mechanism it may be said to consist practically of three parts, and each part is of integral construction, although the sections of the various parts may be secured one to the other, if so desired. These three parts or sections of the brake mechanism may be denominated as a drum-section D, which is shown in Fig. 4, a bearing-section E, (shown in Fig. 5,) and an operating-section F, (shown in Fig. 3,) adapted to drive the drum-section D and to receive a brake-shaft, as will be hereinafter particularly described. The drum-section D consists of two heads 17 and 18 and a spindle 19, connecting the heads. Preferably the heads 17 have bosses 20 integral with their outer faces to reinforce them, and a bevel-pinion 21 is made integral with one of the bosses 20. A bore 22 extends through the said pinion, the heads, and their bosses. Further, in the construction of the drum D openings 23 are made, which receive the ends of chains 24, attached to the eyes of the links 16, and these chains are anchored in place in any suitable or approved manner, as is shown in Fig. 2. The drum-section D is supported in a box C, which is attached in any suitable way beneath a sill B of the car, and at each side of this box a bracket 25 is located, also attached to the sill of the car. The drum-section D is held in the case C by means of the bearing-section E, which section consists of a shaft 26, threaded at each end and provided between its ends with a bearing-block 27. The shaft 26 is passed through the bore 22 in the drum-section D, and the ends of the shaft are carried through the brackets or hangers 25, and nuts 28 are screwed upon the threaded end portions of the shaft 26, as is clearly shown in Fig. 2. The operating-section F (shown in Fig. 3) consists of a body-sleeve 29, having an exterior thread 30 at its lower end, and this body-sleeve is passed down through the bearing 27, being free to turn therein, and is held in place by nuts 31, located on the threaded surface 30 of the body-sleeve below the bearing-block 27, as is also shown in Fig. 2. The said body-sleeve 29 is provided with a polygonal bore 32, which receives the polygonal lower end 33 of a brake-shaft 34, extending up through the platform-section of the car in the usual manner. This brake-shaft is held in position by means of a nut 34ª, screwed on its lower end and having bearing against the bottom portion of the body-sleeve 29 of the aforesaid operating-section F. In the further construction of the said operating-section F the body-sleeve is provided with a bevel-gear 35 at its upper portion, which meshes with the pinion 21 on the drum D.

Heretofore the brake-chains have been usually attached directly to the brake-shaft and have been wound thereon, whereas in the present construction the brake-chains operating each brake-beam are two in number and are attached at opposite ends to a drum controlled by the brake-shaft, so that by a slight movement of either brake-shaft its coöperating drum is turned sufficiently, the brake-chains winding thereon to apply the brakes, and it requires less power to operate a drum and apply the brakes than is required under the ordinary construction of brake mechanisms for vehicles.

I desire it to be understood that I do not restrict myself to the operating of this brake-operating device to a car, but that it may be applied to other forms of vehicles—as, for example, automobiles and the like.

Having thus described my invention, I claim as new and desire to secure by Letters Patent—

1. In a vehicle-brake, a brake-beam, a drum, a shaft on which the drum is mounted to revolve, a link-and-chain connection between the brake-beam and drum, a sleeve carried by the shaft, a gear mounted on the sleeve and meshing with a pinion on the drum, and a brake-shaft for turning the sleeve, as described.

2. In a vehicle-brake, hangers, a shaft carried by the hangers, a sleeve carried by the shaft, a gear mounted on the sleeve, a brake-shaft attached to the said gear, and a drum mounted on the said shaft, provided with a pinion meshing with the gear, said drum being adapted to receive a brake-chain, as described.

3. In brake devices for vehicles, a drum having means for attachment to a brake-chain, a shaft on which the drum is mounted to revolve, a bearing-block carried by the shaft, a sleeve mounted to turn in the bearing-block, a driving connection between the sleeve and drum, and a brake-shaft connected with the sleeve, as described.

4. In a brake device for vehicles, a drum provided with heads having openings formed therein, means for turning the drum, a brake-beam, a lever connected with the brake-beam, a link connected with the lever, and chains extending from the link and having their ends secured in the said openings in the heads of the drum, as described.

5. In a vehicle-brake, hangers, a shaft carried by the hangers and provided with a bearing-block, a sleeve mounted in the bearing-block and having a polygonal bore, a gear carried by the sleeve, a drum mounted on the shaft and provided with a pinion meshing with the gear on the sleeve, a brake-chain connected with the drum, and a brake-shaft having a polygonal lower end engaging the bore of said sleeve, as described.

6. In car-brakes, opposing brake-beams, a lever-bar fulcrumed between the brake-beams, links connecting the brake-beams with the lever-bar at each side of its fulcrum, outer links pivotally attached to the outer ends of the lever-bar, which outer links extend outward in opposite directions, a brake-controlling mechanism for each brake-bar, each of the said mechanisms consisting of a drum, a shaft on which the drum is mounted to revolve, chain connections between the outer links and the said drums, a brake-shaft for each mechanism, and gear connections between the said brake-shafts and the drums, all operating in the manner described.

In testimony whereof I have signed my name to this specification in the presence of two subscribing witnesses.

HENRY HOFFMANN.

Witnesses:
CHARLES A. VAN AUKEN,
FRED L. MERRITT.